(12) United States Patent
De Saint-Romain

(10) Patent No.: US 8,167,990 B2
(45) Date of Patent: May 1, 2012

(54) INGESTIBLE OR NUTRITIONAL LIQUID INK COMPOSITION FOR INK JET PRINTING

(75) Inventor: Pierre De Saint-Romain, Valence (FR)

(73) Assignee: Markem-Imaje, Bourg-les-Valence (FR)

( * ) Notice: Subject to any disclaimer, the term of this patent is extended or adjusted under 35 U.S.C. 154(b) by 3 days.

(21) Appl. No.: 11/913,127

(22) PCT Filed: May 11, 2006

(86) PCT No.: PCT/EP2006/062235
§ 371 (c)(1),
(2), (4) Date: Oct. 30, 2007

(87) PCT Pub. No.: WO2006/120227
PCT Pub. Date: Nov. 16, 2006

(65) Prior Publication Data
US 2008/0193725 A1    Aug. 14, 2008

(30) Foreign Application Priority Data

May 13, 2005 (FR) ...................................... 05 51255

(51) Int. Cl.
*C09D 11/02* (2006.01)
(52) U.S. Cl. ................. 106/31.27; 106/31.6; 106/31.56; 106/31.82
(58) Field of Classification Search ............... 106/31.27, 106/31.6, 31.56, 31.82
See application file for complete search history.

(56) References Cited

U.S. PATENT DOCUMENTS

| | | | |
|---|---|---|---|
| 2,570,353 A | | 10/1951 | Leekley |
| 2,622,988 A | | 12/1952 | Leekley |
| 4,548,825 A | * | 10/1985 | Voss et al. ...................... 426/383 |
| 5,006,362 A | * | 4/1991 | Hilborn ......................... 427/2.23 |
| 5,049,399 A | * | 9/1991 | Huang et al. ...................... 426/87 |
| 5,435,840 A | * | 7/1995 | Hilborn ............................ 524/17 |
| 5,800,601 A | | 9/1998 | Zou et al. |
| 6,143,344 A | * | 11/2000 | Jon et al. ......................... 426/540 |
| 2003/0101902 A1 | | 6/2003 | Reitnauer et al. |
| 2004/0028780 A1 | | 2/2004 | Maser et al. |
| 2004/0063819 A1 | | 4/2004 | Rao et al. |
| 2004/0132862 A1 | | 7/2004 | Woudenberg |
| 2005/0158434 A1 | | 7/2005 | Reitnauer et al. |

OTHER PUBLICATIONS

Database WPI Section Ch, Week 200281, Derwent Publications Ltd., London, GB; Class E24, AN 2002-743782, XP002344745 & JP 2002 179971 A (Toyo FCC KK) Jun. 26, 2002 Abstract.
Database WPI Section Ch, Week 199144, Derwent Publications Ltd., London, GB; Class A82, AN 1991-320210, XP002344746 & JP 03 207775 A (Showa Sangyo Co.) Sep. 11, 1991 Abstract.
Notification of Transmittal of the International Search Report and the Written Opinion of the International Searching Authority, or Declaration issued in PCT/EP2006/062235; Response to Written Opinion.
Notification of Transmittal of the International Preliminary Report on Patentability and International Preliminary Repoert on Patentability issued in PCT/EP2006/062235.

* cited by examiner

*Primary Examiner* — Jerry Lorengo
*Assistant Examiner* — Veronica F Faison
(74) *Attorney, Agent, or Firm* — Pearne & Gordon LLP

(57) ABSTRACT

Nutritional or ingestible ink composition for ink jet printing comprising: a binder comprising at least 0.5% by weight, with respect to the total weight of the ink, of at least one zein; a solvent comprising at least 10% by weight, with respect to the total weight of the ink, of one or more nutritional or ingestible solvent(s); and at least 0.1% by weight, with respect to the total weight of the ink, of one or more nutritional or ingestible dye(s) and/or pigment(s). Dispersion of particles of at least one pigment in at least one polar solvent comprises at least one zein as dispersing agent to facilitate the dispersing of particles and stabilize the dispersion. A process for marking a substrate, in particular a foodstuff, by ink jet printing with the foregoing composition and substrate, for example eggshell, provided with such a marking.

34 Claims, No Drawings

INGESTIBLE OR NUTRITIONAL LIQUID INK COMPOSITION FOR INK JET PRINTING

TECHNICAL FIELD

The invention relates to liquid ink compositions for the marking of supports, substrates and objects of all kinds, the properties of which are particularly well suited to the ink jet printing or marking, by the "deflected continuous ink jet" technique, of a very wide variety of supports, substrates and objects, whether porous or nonporous.

The ink compositions according to the invention are nutritional (dietary, edible) or ingestible ink compositions for human beings or animals, which means that the ink compositions according to the invention generally comprise only nutritional (dietary, edible) or ingestible ingredients, components or constituents at the authorized doses.

A person skilled in the art can readily determine, according to the legislation in force or on the point of being introduced, the compounds which are regarded as ingestible or nutritional (dietary, edible) and their dosages.

For this reason, the ink compositions according to the invention are very particularly suitable for the marking of foodstuffs and of any other product capable being ingested, such as pharmaceuticals, medicaments or others.

Ink jet printing is a well-known technique which makes possible the printing, marking or decorating of all kinds of objects, at high speed and without contact of these objects with the printing device, with messages which can be varied at will, such as bar codes, sell-by dates, and the like, this being the case even on nonplanar supports.

Ink jet printing systems are divided into two main types: the Drop-on-Demand (DOD) type and the Continuous Ink Jet (CIJ) type.

Deflected continuous ink jet projection consists in conveying ink under pressure into a cavity comprising a piezoelectric crystal, whence the ink escapes via an orifice (nozzle) in the form of a jet. The piezoelectric crystal, vibrating at a predetermined frequency, causes pressure disruptions in the ink jet, which oscillates and is gradually broken up into spherical drops or droplets. An electrode, placed on the path of the jet, at the point where it is broken up into spherical drops, makes it possible to give an electrostatic charge to these drops, if the ink is conducting. The drops, thus charged, are deflected in an electric field and allow printing to occur. The uncharged drops, which are thus not deflected, are recovered in a gutter, where the ink is sucked up and then recycled to the ink circuit.

This type of continuous jet ink projection provides contact-free marking at a high rate of forward progression on objects which are not necessarily flat and with the possibility of message change at will.

The technique is particularly suitable for the marking and identification (expiry dates, serial numbers, batch numbers, bar codes, and the like) of industrial products on production lines.

The field of application described requires varied ink formulations which are suitable for the variety of the substrates to be marked and which meet a very wide variety of industrial constraints.

"Drop-on-Demand" ink jet projection can be carried out by "bubble" ink jet projection or by "piezoelectric" ink jet projection. In the first case, the ink is atomized in the vicinity of the nozzle and this atomization brings about the ejection of the small amount of ink situated between the resistance which atomizes the ink and the nozzle. In the second case, a sudden variation in pressure, brought about by an actuator motivated by the electrical excitation of a piezoelectric ceramic or crystal and situated in the vicinity of the nozzle, brings about the ejection of a drop of ink.

The diameter of the nozzles for the DOD ink jet is of the order of 10 to several tens of microns. For the continuous ink jet, the diameter of the nozzles is greater, of the order of 30 to 100 microns.

The ink compositions suitable for ink jet projection have to satisfy a number of criteria inherent in this technique relating, inter alia, to the viscosity, the solubility in a solvent for cleaning, the compatibility of the ingredients, the correct wetting of the supports to be marked, and the like, and the electrical conductivity, in the case of the deflected continuous ink jet.

Furthermore, these inks have to dry rapidly, be capable of flowing or of remaining immobile in the vicinity of the nozzle without blocking it, with a high orientational stability of the ink jet, while making possible ready cleaning of the printhead.

These inks must be carefully formulated and filtered in order not to comprise particles with a size capable of blocking the nozzles. Filtrations at thresholds of between 0.2 and 1 $\mu m$ are generally applied.

The ingredients of which current inks for ink jet printing of deflected continuous ink jet type are composed are inorganic or organic products; they are colouring materials, such as dyes or pigments, resins or binders, in one or more more or less volatile solvent(s) or in water, and optionally one or more salt(s) which contribute(s) conductivity, and also various additives.

The ingredients of which current inks for ink jet printing of drop-on-demand (DOD) type are composed are also organic or inorganic products; dyes or pigments, resins or binders, in one or more more or less volatile solvent(s) or in water, in proportions other than those of the inks for deflected continuous ink jet printing but without the need for electrical conductivity.

The inks intended to directly mark foods or any other product which has to be ingested, such as medicaments or "food supplements", must comprise only foodstuffs or products capable of being ingested. Depending on the country and the continent, the products authorized are not necessarily the same. Depending on the products to be marked, the list of the ingredients authorized is not the same either. In Europe, food additives are codified by an EXXX number and their use is regulated by European Directives.

In the United States, the uses, definitions and purities are defined by the Code of Federal Regulations (CFR), vol. 21. (CFR 21).

Furthermore, several religious communities practise various recommendations with regard to the origin of foodstuffs and materials used for their marking. Products of animal origin and fermentation products are affected by these recommendations.

Colouring materials are referred to as dyes or pigments according to whether they are respectively soluble or insoluble in the solvent used.

Food dyes include natural dyes of vegetable or animal origin, artificial dyes and dyes of synthetic origin, such as, for example, erythrosine (E127) or carmoisine (E129).

Other food dyes are mentioned, for example, in Patents GB-B-2 277 094, U.S. Pat. Nos. 5,800,601 and 5,637,139, to the description of which reference may be made.

The pigments, which are insoluble by nature, are thus dispersed and may or may not be opaque. They give the ink its colour and/or its opaqueness. Those which are nutritional (dietary, edible) or ingestible include, inter alia, vegetable carbon black, titanium oxide (E171) (cf. Patent U.S. Pat. No. 6,747,072), iron oxide (E172) or lakes, that is to say nutritional (dietary, edible) dyes fixed, absorbed on an insoluble support or substrate, for example on alumina particles. Reference may be made, on that subject, to the documents U.S. Pat. No. 5,800,601 EP-B1-0889938.

Titanium oxide, the most widely used white pigment, exists in a food grade. Patent U.S. Pat. No. 5,800,601, which has already been mentioned, discloses how to disperse it in a medium, making possible the formulation of a nutritional (dietary, edible) ink. The stability of the dispersion is provided by virtue of a coating of the titanium oxide particles, in particular with shellac. In point of fact, shellac is a product of animal origin resulting from the secretion of an insect and several religious communities recommend not consuming foods of animal origin.

There thus exists a specific requirement for stable dispersions of pigments which would be able to be prepared by virtue of products which are not of animal origin.

The binder(s) or resin(s) is (are) generally for the most part (a) solid and polymeric compound(s) and their choice is dictated by their solubility in the solvents selected and by their compatibility with the dyes and the other additives but also and in particular by the properties which they contribute to the film of ink, once dry.

Their first role is to provide the ink with adhesion to the maximum of supports or to specific supports, for example nonporous supports. They also make it possible to give the ink the viscosity appropriate for the formation of the drops from the ink jet and they provide the ink, or rather the marking obtained, with the bulk of its properties of resistance to physical and/or chemical attacks.

A distinction is generally made between binders which are soluble in water and binders which are soluble in nonaqueous solvents.

The binders which are soluble in nutritional (dietary, edible) inks are in particular cellulose derivatives, such as hydroxypropylcellulose, hydroxymethyl propyl cellulose or sodium salts of carboxymethyl cellulose, polyvinylpyrrolidone, and yet others, such as those mentioned in U.S. Pat. No. 5,800,601, to the description of which reference may be made. Such binders, even if some of them are also soluble in nonaqueous solvents, such as ethanol or acetone, have a solubility in water such that it renders the inks in the wet or dry phase highly sensitive to water and to humidity. Such formulations cannot give markings which are sufficiently resistant to the water, such as the condensation, very often encountered on foodstuffs stored under cold conditions.

The binders used until now in the nonaqueous media of nutritional (dietary, edible) inks are either rosin, or one of its derivatives, and shellac. The major disadvantage of shellac is its animal origin. Rosin and its derivatives are molecules of low molecular weight. For this reason, their incorporation in the inks requires a high percentage of such resins, which can have a harmful effect on the behaviour of such inks in ink jet printers. Excessively high solid contents in the ink result in situations where the solubility limit may be reached, which can result in nozzle blockages, and renders the quality of the start-ups uncertain. Shellac, like rosin and its derivatives, are regarded in the United States as "additives" acceptable under certain conditions and for certain uses. They do not have the more enviable status of "generally recognized as safe" (G.R.A.S.), which would allow them to be used in a greater number of food applications.

There thus exists a need for binders which do not have the disadvantages of the water-soluble binders, which preferably do not have an animal origin, thus allowing formulations which are more acceptable to all the communities and countries with different cultures, and which provide better operating reliability in the printer.

The additives comprise:
plasticizers which soften the film of dry ink, which can improve the adhesion and the cohesion of the ink on the marked support,
dispersants which make possible the dispersing of the pigments. Such dispersants stabilize the pigments by a steric effect and/or by an electrostatic effect according to whether they are ionizable or not and according to the polarity of the solvent.
agents which inhibit the corrosion brought about by certain salts, such as chlorides, which contribute the conductivity (see documents EP-A-0 510 752 and U.S. Pat. No. 5,102,458),
additives which protect the ink from growths of bacteria and of other microorganisms: they are biocides, bactericides, fungicides and others which are particularly useful in water-comprising inks,
pH-regulating buffers (see EP-A-0 735 120),
antifoaming agents.

The inks for ink jet printing which are non-nutritional (dietary, edible) also comprise surfactants which modify the wetting or penetrating power of the ink (cf. U.S. Pat. No. 5,395,431), in particular those which modify or regulate the static or dynamic surface tension, such as Fluorad FC 430 from 3M. Such products equalize the size of the impacts of the drops. By virtue of them, the impacts of the drops all have the same diameter, whatever the nature, the cleanliness or the evenness of the support. Eggshells are a typical example of a surface which is uneven from this viewpoint. In point of fact, these products are not and cannot be nutritional (dietary, edible) or ingestible.

There thus exists a need for nutritional (dietary, edible) and ingestible inks which provide markings of high quality and evenness, whatever the support, in particular if the latter exhibits an uneven surface, this preferably being the case even in the absence of any surfactant.

The additives also comprise, in the case of inks for deflected continuous ink jet printing, optionally one or more conductivity salts.

The optional conductivity salt(s) provide(s) the ink with the conductivity necessary for the electrostatic deflection. Reference may be made, on that subject, to the document U.S. Pat. No. 4,465,800. However, it may be noted that, in some cases also, the dyes already contribute sufficient conductivity to the ink for there to be no need to add a conductivity salt.

Use is made, among the salts which contribute the conductivity, of any type of entity which can be ionized, dissolved and dissociated in the solvent medium of the ink.

In the specific case of nutritional (dietary, edible) or ingestible inks, it is very clear that the salts are chosen from nutritional (dietary, edible) or ingestible salts regarded as harmless; the Code of Federal Regulations of the United States, CFR, Part 21, §184.1, for example, lists a large number of them.

In some cases also, the dyes themselves also contribute sufficient conductivity to the ink for there to be no need to add a conductivity salt.

For the inks where the predominant solvent is water, the contribution of conductivity to the ink does not generally present a problem as the majority of the products which are soluble in water are ionizable entities.

The solvents which can be used for nutritional (dietary, edible) inks are, on the one hand, in a generally predominant amount volatile solvents of low viscosity, in order to make possible the very rapid drying of the markings and to adjust the viscosity to the desired value, for example from 2 to 10 mPa.s, and not to remain in an infinitesimal amount in the markings, such as acetone or ethanol; and, on the other hand, solvents of greater viscosity and lower volatility which dry more slowly, in a lesser amount, such as water, propylene glycol or glycerol. They absolutely have to be able to be ingested as there is a risk of them never completely evaporating from the markings. Another role of the solvents which dry more slowly can be to prevent the ink from drying at the nozzle during shut-down phases of the printing device, thus improving the quality of the start-ups after lengthy shut-downs in deflected continuous ink jet printing.

In DOD ink jet printing, the presence of predominant solvents of low volatility is also necessary to prevent the formation of dry ink at the nozzle and to make possible printing at any time and in particular to provide good quality of the start-ups of the printing even after lengthy shut-downs. A major disadvantage of these least volatile solvents is that of lengthening the drying time of the ink, which can present a problem if the freshly marked objects have to be handled.

There thus exists a need for a rapid-drying ink which exhibits good quality start-ups after lengthy shut-downs.

In more detail, the volatile solvents most often used are alcohols, ketones or esters of low molecular weight, as is indicated in Patents U.S. Pat. Nos. 4,567,213 and 5,637,139. Mention may essentially be made, among these solvents, of methanol, ethanol, 1-propanol, 2-propanol, acetone, methyl ethyl ketone (MEK) and methyl isobutyl ketone.

The less volatile solvents, having in particular a role of slowing down drying, are most often ketones, such as cyclohexanone, glycol ethers, mentioned in the documents U.S. Pat. Nos. 4,024,096 and 4,567,213, ethers and acetals, such as furan or dioxane, mentioned in the document U.S. Pat. No. 4,155,767, dimethylformamide or dimethyl sulphoxide (U.S. Pat. No. 4,155,895), lactones (EP-A-0 034 881), N-methylpyrrolidone (EP-A-0 735 120), glycols (WO-A-96/23844), and even aliphatic hydrocarbons (U.S. Pat. No. 4,166,044), or also water, alone or in combination with other solvents mentioned above; reference will be made, in this connection, to the documents U.S. Pat. No. 4,153,593, GB-A-2 277 094 and FR-A-2 460 982.

Among these solvents, a person skilled in the art can readily determine those which are acceptable for nutritional (dietary, edible) inks. Generally, the main or predominant solvents of inks for ink jet printing by deflected continuous ink jet projection have to meet a number of criteria, in particular:

their volatility has to be sufficient for the ink to rapidly dry on the support to be marked, but not too great, in order not to evaporate too quickly in the printer, in particular during shut-down phases;

their solvating power with regard to the binders of the ink, the dyes or the pigment dispersions and with regard to the supports to be printed must make it possible to confer good adhesion on the dry ink;

the predominant or main solvents (and also to a lesser extent the secondary solvents) must, in the case where the ink is an ink for deflected continuous ink jet printing, have the ability to keep the ionic entities dissociated, such as the salts which provide the ink with its electrical conductivity.

Finally, the solvents for ingestible nutritional (dietary, edible) inks should basically be ingestible nutritional (dietary, edible) solvents.

It emerges from the above that there exists an as yet unsatisfied need for a nutritional (dietary, edible) or ingestible ink capable of being projected by ink jet printing, in particular by the deflected continuous ink jet printing technique, the composition of which can satisfy the regulatory requirements of the greatest number of countries but also which can be accepted by the most diverse communities, clients and consumers. In particular, there remains a need for ingestible or nutritional (dietary, edible) ink compositions which do not comprise constituents of animal origin.

There also exists a need for a suitable ink, in particular suitable for deflected continuous ink jet printing, which makes possible the rapid marking of all types of objects with different surface characteristics, both porous and nonporous.

In addition, the ink must give a marking which exhibits good adhesion and good resistance to chemical attacks; in particular, it must give a water-resistant marking and, generally, it must exhibit all the properties commonly required by inks for ink jet printers, in particular inks for printers using the deflected continuous ink jet printing technique: viscosity, resistivity, and the like. The ink must simultaneously have the property of rapidly drying, of not blocking the nozzles and of thus making possible rapid start-up, even after a lengthy shut-down.

In addition, the ink must make possible the high-speed marking of objects of all kinds, even weakly porous, while always giving printing or marking of excellent quality and evenness.

The aim of the invention is thus to provide an ingestible or nutritional (dietary, edible) ink composition suitable for deflected continuous ink jet printing which meets, inter alia, all the requirements indicated above, which satisfies the criteria and demands mentioned above, which does not exhibit the disadvantages, limitations, failings and drawbacks of the ink compositions of the prior art and which overcomes the problems of the compositions of the prior art related in particular to the nature of the binder.

This aim and yet others are achieved in accordance with the invention by a nutritional (edible, dietary) or ingestible ink composition for ink jet printing by the deflected continuous ink jet printing technique which is liquid at ambient temperature comprising:

a) a binder comprising at least 0.5% by weight, with respect to the total weight of the ink, of at least one zein;

b) a solvent (or vehicle) comprising at least 10% by weight, with respect to the total weight of the ink, of one or more nutritional or ingestible solvent(s);

c) at least 0.1% by weight, with respect to the total weight of the ink, of one or more nutritional (dietary, edible) or ingestible dye(s) and/or pigment(s); the said ink composition having a conductivity of greater than 300 µS/cm at 20° C.

The term "ambient temperature" is understood to mean, generally, a temperature of 5 to 30° C., preferably of 10 to 25° C., more preferably of 15 to 24° C., better still of 20 to 23° C. It is clearly understood that the ink is liquid at atmospheric pressure.

Zein is a protein (prolamine) extracted from maize seeds. It is used predominantly for the coating of confectionary and pharmaceutical tablets. It is odourless, virtually without flavour and "straw yellow" in colour. It is regarded by the authorities in the United States as G.R.A.S. It is regarded as a "food" and not only as a "food additive". It is film-forming and is used in the confectionary and pharmaceutical fields as coating.

There exists several types of zeins extracted from maize: α, β, γ and δ zeins.

The zein incorporated in the ink composition according to the invention is advantageously chosen from α, β, γ and δ zeins and their mixtures and combinations such as their natural mixtures and combinations.

α Zein, which is completely soluble in 95% ethanol, is a polypeptide with a molecular weight of between 21 and 25 000 daltons.

β Zein is soluble in water/ethanol mixtures comprising 40% water.

The zein available commercially is a mixture of α and β zeins which is rich in α zein.

For this reason, the zein of the ink composition according to the invention is advantageously chosen from mixtures and combinations of α zein and of β zein, preferably from mixtures and combinations of α zein and of β zein comprising more than 50% by weight of α zein.

The zeins differ from one another in their content of their various amino acids and in their molecular weight.

Zein comprises 65% by weight of nonpolar amino acids, such as alanine, leucine and proline. For this reason, it is insoluble in water and soluble in ethanol. The 9 predominant amino acids from the 16 which it comprises are:

| | |
|---|---|
| glutamic acid and glutamine | 20-22% |
| leucine | 17-20% |
| proline | 5-9% |
| alanine | 8-10% |
| phenylalanine | 4-7% |
| isoleucine | 3-7% |
| serine | 4-6% |
| tyrosine | 3-5% |
| asparagine | 4-5% |

Advantageously, the ink composition comprises at least 0.5% by weight, preferably at least 2% by weight, more preferably at least 4% by weight, better still at least 6% by weight, with respect to the total weight of the ink, of at least one zein.

Advantageously, the ink composition comprises from 0.5 to 25% by weight, preferably from 1 to 20% by weight, more preferably from 4 to 15% by weight, better still from 6 to 10% by weight, with respect to the total weight of the ink, of at least one zein.

The ink according to the invention is a specific ink for the deflected continuous ink jet printing of foodstuffs or non-foodstuffs which essentially comprises zein in specific proportions, which comprises only ingestible or nutritional (dietary, edible) ingredients and which is liquid at ambient temperature.

In other words, the ink composition according to the invention essentially differs from the ink compositions of the prior art in that it is specifically an ink composition for ink jet printing by the deflected continuous ink jet printing technique, in that it comprises at least one zein, in a specific proportion of at least 0.5% by weight of the total weight of the ink composition, and in that it is an ingestible or nutritional (dietary, edible) ink.

No document of the prior art discloses an ink exhibiting the combination of these specific characteristics of the composition according to the invention.

Thus, the document US-A1-2004/0028780 discloses collagen-based detachable ingestible ("edible") labels additionally comprising at least one secondary component chosen from polyols, cellulose, hydrocolloids, proteins other than collagen, and food dyes. The proteins other than collagen are in particular gelatin, soybean proteins, gluten, casein and zein.

The document US-A1-2003/0101902 relates to ingestible hot-melt inks which are solid at ambient temperature and which can comprise a resin; 67 resins and families of resins are given as examples, including zein. A preferred resin is Foral 85 from Hercules, which is a hydrogenated rosin ester resin; this resin is the only resin used in the 4 examples of this document.

The document US-A1-2004/0132862 relates to hot-melt or liquid inks which can be cured, polymerized or crosslinked by irradiation, for example by UV irradiation.

These liquid inks can be used in ink jet printing. These inks can comprise an additive, such as a wax or resin; 67 resins or families of resins are given as examples, including zein. None of the eight hot-melt ink compositions given as examples comprises zein.

In addition, no mention is made in this document indicating that the inks which are described therein are ingestible or nutritional (dietary, edible).

The document US-A1-2004/0063819 discloses a composition for forming a layer of primer on a sheet of polymer which comprises a polyethyleneimine, a latex and a hydrophilic colloid material. Numerous hydrophilic colloids are mentioned, including zein. No mention is made in this document that the compositions which are described therein are ingestible or nutritional (dietary, edible).

The document U.S. Pat. No. 2,570,353 relates to conventional printing inks which are not inks for ink jet printing since this technique did not yet exist in 1951, the date at which this document was published. These inks comprise a suspension of a pigment in a zein solution to which a lubricant and a wetting agent are added. Again, no mention is made in this document indicating that the inks which are described therein are ingestible or nutritional (dietary, edible).

The incorporation of a zein in the specific proportions mentioned above in ink compositions for ink jet printing, more specifically in ink compositions for deflected continuous ink jet printing, these compositions being specifically nutritional (dietary, edible) or ingestible compositions, is therefore neither disclosed nor suggested in the prior art.

This is because the majority of the patents or patent applications of the prior art mention the use of zein only optionally and in minor proportions with respect to the other binders of inks for ink jet printing and only in drop-on-demand (DOD) ink jet printing.

The ink composition according to the invention meets all the requirements mentioned above, satisfies all the criteria and demands listed above and solves the problems which would be encountered with the ingestible or nutritional (dietary, edible) ink compositions of the prior art.

Surprisingly, it has been found that the composition according to the invention, due to the presence of zein essentially as binder, makes it possible to formulate stable ink compositions which rapidly dry while not causing blocking of the nozzles, which provide easy start-up and which generally satisfy all the criteria, demands and requirements of the deflected continuous ink jet printing technique.

In addition, it has been demonstrated, surprisingly, that zein facilitates the dispersing of the pigments in the solvent and even stabilizes these dispersions. Such a dispersing and stabilizing effect of zein is neither disclosed nor suggested in the prior art.

Zein, surprisingly, thus makes it possible in particular to formulate stable pigment dispersions and nutritional (dietary, edible) or ingestible inks, with a minimum of solvent of low volatility, which can be projected by deflected continuous ink jet printing.

In other words, it has been demonstrated, completely surprisingly, according to the invention, in particular, that zein, on the one hand, makes possible the dispersing and the stabilizing in a liquid medium of pigments and, on the other hand, that zein gives solutions which are compatible with nutritional (dietary, edible) salts and which can be projected by the deflected continuous ink jet printing technique.

The compositions of the invention give markings of high quality and evenness, whatever the support, such as an eggshell.

As will be seen later, the incorporation in the ink compositions according to the invention of PDMS additionally makes it possible, surprisingly, to equalize the spreading of the ink.

The markings obtained are resistant to water, due, it appears, to the unexpected film-forming properties of zein.

In the documents of the prior art, zein is mentioned only among a very large number of other resins. Nothing could allow it to be supposed that, by choosing zein among these very numerous resins, it would be possible to obtain a nutritional (dietary, edible) or ingestible ink for ink jet printing by the deflected continuous ink jet printing technique exhibiting the effects and advantages of the ink compositions according to the invention. Nothing in the documents of the prior art could allow it to be supposed by a person skilled in the art that, specifically, zein, among the numerous other resins, might communicate such advantageous properties to ink compositions for ink jet printing by the deflected continuous ink jet printing technique. Furthermore, the issues with nutritional (dietary, edible) ink compositions are highly specific and the incorporation of a component, such as zein, in an ink does not in any way indicate that this same component may be suitable for incorporation in a specifically nutritional (dietary, edible) or ingestible ink composition.

The use of zein as binder and/or dispersant in the compositions according to the invention in addition makes it possible preferably to avoid having recourse to binders and/or dispersants of animal origin in the compositions of the invention. Advantageously, the composition according to the invention thus comprises only artificial, synthetic or mineral constituents or constituents of vegetable origin, or other, with the exclusion of any constituent of animal origin.

In the composition according to the invention, the solvent or vehicle comprises one or more solvent(s) which generally represent(s) at least 10% by weight of the total weight of the ink composition; preferably, the solvent(s) represent(s) from 30 to 90% by weight, more preferably from 60 to 80% by weight, of the total weight of the ink composition.

The solvent comprises one or more organic solvent(s) and optionally water.

The said organic solvent(s) forming part of the solvent is (are) chosen from nutritional (dietary, edible) or ingestible solvents.

Such solvents are known to a person skilled in the art of this field and can be easily identified among the solvents used in ink compositions for ink jet printing by the deflected continuous ink jet printing technique.

The said organic solvents can be chosen from ethanol (e.g. denatured or non denatured ethanol), propylene glycol, ethyl lactate, methyl lactate, ethyl acetate, isopropanol, acetic acid, aqueous ammonia and their mixtures. Some of the solvents constituting the solvent of the ink can be used alone and others not. Thus, neither ethanol nor water can be used alone, in contrast to ethyl lactate.

Preferably, the solvent of the ink composition predominantly comprises (or comprises a major amount) (that is to say, in a proportion of more than 50% by weight) ethanol in combination with at least one other solvent, such as ethyl lactate and/or methyl lactate and/or water.

Another preferred solvent is composed of ethyl lactate alone.

The ethanol may or may not be denatured with various products according to the regulations in force in the country of use. The denaturing can be special, in order for the alcohol thus denatured to be able to be useable in nutritional (dietary, edible) applications.

Preferably, the solvent(s) has (have) the property of dissolving the other ingredients of the ink, in particular the binder, the colouring materials, the additives, and the like.

The ink composition according to the invention comprises one (or more) dye(s) and/or pigment(s) which is (are) chosen from nutritional (dietary, edible) or ingestible dyes and/or pigments, such as curcumin (E100); riboflavin (E101); riboflavin-5'-phosphate (E101(a)); tartrazine (E102); quinoline yellow (E104); yellow 2G (E107); orange yellow sunset (E110); cochineal (E120); carmoisine (E122); amaranth (E123); cochineal red A, ponceau 4R (E124); erythrosine (E127); red 2G (E128); allura red AC (E129); patent blue V (E131); indigotine (E132); brilliant blue FCF (E133); chlorophyll (E140); copper complexes of chlorophylls and chlorophyllins (E141); green S (E142); caramels (E150); brilliant black BN (E151); medicinal vegetable carbon (E153); brown FK (E154); brown HT (E155); dyes of the carotenoid family (E160); xanthophylls (E161); beetroot red (E162); anthocyanins (E163); calcium carbonate (E170); titanium dioxide (E171); iron oxides and hydroxides (E172); aluminium (E173); silver (E174); gold (E175); lithol rubine BK (E180); tannin (E181); and their mixtures.

The pigments also include lakes.

The total amount of dye(s) and/or of pigment(s) is generally from 0.05 to 25% by weight, preferably from 1 to 20% by weight, more preferably from 3 to 10% by weight, of the composition.

The composition according to the invention can be provided in the form of a dispersion of particles of at least one pigment in the solvent or vehicle of the ink composition. The pigment is preferably a white pigment, such as titanium dioxide. Preferably, in the said dispersion, 100% of the particles have a size of less than 0.4 µm.

This is because it has been seen above that zein made it possible, surprisingly, to separate and to facilitate the dispersing of the pigments in a solvent and even to stabilize these dispersions.

For this reason, the invention also relates to nutritional (dietary, edible) or non-nutritional (dietary, edible) dispersions of particles of at least one pigment in at least one polar solvent comprising at least one zein as dispersing agent in which 100% of the particles have a size of less than 0.4 µm.

The said polar solvent is chosen from polar solvents known to a person skilled in the art.

The invention also relates to dispersions of pigment particles composed of at least one polar solvent, particles of at least one pigment, and at least one zein.

Preferably, the pigment is a white pigment, such as titanium dioxide (E171).

In the said dispersion, 100% of the particles have a size of less than 0.4 µm.

The invention additionally relates to the use of at least one zein to facilitate the dispersing of particles of at least one pigment in at least one polar solvent.

Finally, the invention relates to the use of at least one zein to stabilize a dispersion of particles of at least one pigment in at least one polar solvent.

The binder of the composition of the invention may only be composed solely of one or more zein(s).

Alternatively, the ink composition according to the invention can comprise, as binder, in addition to at least one zein, one or more nutritional (dietary, edible) and/or ingestible polymer(s) and/or resin(s), the zein(s) being in a predominant proportion (greater than 50%) with respect to the total weight of the binder.

Nutritional (edible, dietary) and/or ingestible polymers and resins are known to a person skilled in the art of this field and can be easily identified among the polymers and resins used in ink compositions for ink jet printing by the deflected continuous ink jet printing technique. Preferably, polymers and resins of animal origin are avoided.

This (these) polymer(s) and/or resin(s) is (are) preferably chosen from cellulose ethers, such as ethylcellulose, methylcellulose, hydroxyethylcellulose, hydroxymethylpropylcellulose, carboxymethylcellulose or hydroxypropylcellulose; shellac; rosin and its nutritional (dietary, edible) derivatives; polyvinylpyrrolidone; polyvinyl alcohol; cellulose esters, such as cellulose acetate or cellulose acetate propionate; and their mixtures.

Examples of these polymers or resins are as follows: the Pharmacoat products from Shin Etsu and the Blanose and Klucel products from Aqualon.

The proportion of binder (including zein) in the ink composition according to the invention is generally from 0.1 to 30% by weight, preferably from 1 to 25% by weight, more preferably from 3 to 20% by weight.

The ink composition according to the invention can optionally comprise, in addition, at least 10 ppm and generally up to 0.5% by weight, preferably up to 1% by weight, of a polydimethoxysiloxane (PDMS) of food grade, for example a polydimethylsiloxane in accordance with the specifications of the additive E900 according to European legislation.

It has been found, astonishingly, that incorporating PDMS in the ink compositions according to the invention made it possible to promote the spreading of the ink deposited on the substrate, in particular in the case where a mixture of water and of ethanol is used as solvent.

This is because the surface tension of the water/alcohol (ethanol) mixtures varies significantly with the concentration of water or of alcohol. The ink deposited is subjected to preferential evaporation at its periphery, resulting in the formation of a border which widens and spreads.

It turned out, surprisingly, that the PDMS, when it was incorporated in the ink compositions of the invention, had a significant effect in modifying and regulating the surface tension and, consequently, also regulated the spreading of the ink deposited, for example in the form of a drop.

It may be considered that the PDMS acts, in the ink according to the invention, entirely unexpectedly, as spreading regulator which greatly improves the quality of the marking obtained with the compositions of the invention in comparison with inks not comprising PDMS. In addition, the PDMS exhibits the critical property of being ingestible or nutritional (dietary, edible) and of thus being able to be incorporated without difficulty in the ingestible or nutritional (dietary, edible) ink compositions according to the invention.

The inventors have demonstrated, surprisingly, that the only compound which significantly regulates the surface tension and which is ingestible or nutritional (dietary, edible) is PDMS.

The combination in a nutritional (dietary, edible) ink composition of zein and of a PDMS has never been disclosed or suggested in the prior art and results in an amalgam of advantageous properties of the ink composition and of the marking obtained with the latter which has never been obtained with the ink compositions of the prior art.

The zein gives hard and brittle films. For this reason, in particular if the support to be marked is flexible, the ink composition can additionally comprise one or more plasticizer(s) in order to improve its adhesion. These plasticizers are chosen from nutritional (dietary, edible) or ingestible plasticizers and it is preferable to avoid plasticizers of animal origin.

The plasticizer(s) is (are) chosen, for example, from glycerol, lactic acid, oleic acid, polypropylene glycol, fatty acid triglycerides, citrates and esters of citric acid, levulinic acid, and their mixtures.

The plasticizer(s) is (are) generally present in a proportion of at least 0.05% by weight, preferably in a proportion of 0.1 to 20% by weight, of the total weight of the ink composition.

The composition according to the invention which can be projected by deflected continuous ink jet printing can in addition generally comprise at least one conductivity salt, unless another ingredient, such as a dye, a pigment or any other ingredient, is itself a salt which can provide the conductivity when it is dissociated.

This is because the ink according to the invention which can be applied by deflected continuous ink jet printing has to have a satisfactory electrical conductivity in the liquid state generally of greater than 300 µS/cm at 20° C., preferably of 500 µS or of greater than 500 µS/cm, for example of the order of 500 to 2000 µS/cm (at 20° C.).

If therefore it is necessary to include, in the ink composition, a conductivity salt other than the dyes and other compounds capable of being dissociated, this conductivity salt is generally chosen from nutritional (dietary, edible) or ingestible salts. A person skilled in the art can easily identify, among the conductivity salts used in ink jet printing by the deflected continuous ink jet printing technique, nutritional (dietary, edible) or ingestible conductivity salts.

These salts can thus, for example, be chosen from the salts listed in the Code of Federal Regulations (CFR) of the United States, Title 21, §184.1.

Mention may in particular be made, among the nutritional (dietary, edible) or ingestible salts, of potassium, sodium or ammonium acetates, propionates, citrates or lactates.

These conductivity salts will thus be present, if necessary, in the ink composition so as to give the ink the above conductivity: their amount is generally at least 0.05% by weight, their amount is preferably from 0.1 to 20% by weight, more preferably from 0.1 to 10% by weight and better still from 0.1 to 5% by weight, of the total weight of the ink composition.

The composition according to the invention can additionally comprise one or more additives chosen from compounds which improve the solubility of some of these components, the printing quality, the adhesion or the control of the wetting of the ink on various supports.

The additive(s) can be chosen, for example, from antifoaming agents, chemical stabilizers, surface-active agents, bactericides, fungicides and biocides, pH-regulating buffers, and the like. Mention may be made, among biocidal additives, for example, of methyl, ethyl, propyl or butyl benzoates, sorbates or para-hydroxybenzoates. All these additives are chosen from nutritional (dietary, edible) or ingestible additives. It should be noted that the additive(s) is (are) used at very low doses, generally of less than or equal to 5% and sometimes as low as 0.01%, depending on whether they are antifoaming agents, stabilizers or surfactants.

Another subject-matter of the invention is a process for marking a substrate or objects, for example porous or nonporous, by projection onto this substrate or these objects of an ink composition, such as described above.

The marking is carried out by the ink jet printing technique by the "deflected continuous ink jet" printing technique.

Another subject-matter of the invention is a substrate, object or support, for example porous or nonporous, provided with a marking obtained by the drying of the ink composition, as described above.

Due to the fundamentally nutritional (dietary, edible) or ingestible nature of the ink composition of the invention, it is suitable for the direct marking of all foodstuffs or ingestible products capable of being ingested, in particular via the mouth.

The substrate can thus be chosen from foodstuffs, such as fruit, vegetables, meat, eggs or confectionary, such as chocolate, and pharmaceuticals, such as tablets, capsules, pastilles and lozenges.

Markings or printed images of excellent quality are obtained on all substrates, even those of very low porosity, and even on substrates exhibiting a very uneven surface, such as eggshells.

The invention will be better understood on reading the following description of embodiments of the invention, these being given by way of illustrative examples without implied limitation.

EXAMPLES

The following ink compositions according to the invention were prepared by mixing the products mentioned in Table I below in the proportions shown. The viscosities and the conductivities of the inks obtained are also given below.

TABLE I

| | Examples (percentages by weight) | | | | | |
|---|---|---|---|---|---|---|
| | No. 1 | No. 2 | No. 3 | No. 4 | No. 5 | No 6 |
| 95% Nondenatured ethanol | 71.8 | 71.4 | 70.9 | 61.4 | 58 | 64 |
| Ethyl lactate | | | 20 | | 25 | 19 |
| Methyl lactate | 20 | 20 | | | | |
| Water | | | | 30 | | |
| Erythrosine (E127) | 2 | | 1 | 2 | | |
| FD&C Blue 1 (E133) | | 2 | 1 | | | |
| Titanium oxide (E171) | | | | | 10 | 10 |
| Zein | 6.5 | 6.5 | 6.5 | 6.5 | 5 | 4 |
| Shellac | | | | | | 1.5 |
| Hydroxy propyl cellulose | | | | | | 0.2 |
| Aqueous ammonia | | | | | | 0.2 |
| Oleic acid | | | | 0.5 | | |
| Glycerol | 0.6 | | | | | |
| Triethyl citrate | | | | | 0.5 | |
| Sodium lactate | | 1 | | | 1.4 | |
| Sodium propionate | | | | | | 1 |
| PDMS (Dow Corning Fluid 200, food grade, 350 cSt) | 0.1 | 0.1 | 0.1 | 0.1 | 0.1 | 0.1 |
| Viscosity (mPa · s) | 4.4 | 4.0 | 4.5 | 4.2 | 5.2 | 5.7 |
| Conductivity (μS/cm) | 660 | 820 | 575 | 960 | 650 | 780 |

The inks of Examples 1 to 4 were prepared by simple mixing of the various ingredients with stirring.

The inks of Examples 5 and 6 were prepared by milling all the mixed ingredients in a bead mill. After filtering through a filter with an absolute porosity of 2 μm, each of Examples 1 to 6 gives an ink which can be projected by ink jet printing in Imaje printers of Jaime 1000 series 8 type and makes it possible to obtain printed images of excellent quality.

Example 1

The ink produced is a red ink for a deflected continuous ink jet printer.

Example 2

This ink is a turquoise blue ink for a deflected continuous ink jet printer.

Example 3

This ink is a blue ink for a deflected continuous ink jet printer.

Example 4

This ink is a red ink for a deflected continuous ink jet printer.

Example 5

This ink is white for the marking of dark supports, such as chocolate, by deflected continuous ink jet printing. The size of the particles was measured using an Autosizer II particle sizer manufactured by Malvern Instruments Ltd (Malvern UK). The "Z-average" mean, measured with dilution in an ethanol/methyl lactate (70/30 weight/weight) mixture, is found at 262 nm and the mean of the distribution given by the Contin algorithm is found at 206 nm. The distribution of the particle sizes gives no particles with a diameter of greater than 400 nm.

Example 6

This ink is white for the marking of dark supports by deflected continuous ink jet printing.

The size of the particles was measured using the Autosizer II particle sizer and the "Z-average" mean, measured with dilution in an ethanol/methyl lactate (70/30 weight/weight) mixture, is found at 222 nm and the mean of the distribution given by the Contin algorithm is found at 192 nm.

The invention claimed is:

1. Nutritional or ingestible ink composition for ink jet printing by the deflected continuous ink jet printing technique which is liquid at ambient temperature comprising:
    a) a binder comprising at least 0.5% by weight, with respect to the total weight of the ink, of at least one zein, the zein being present in an amount greater than 50% by weight based on the total weight of the binder;
    b) a solvent comprising at least 10% by weight, with respect to the total weight of the ink, of one or more nutritional or ingestible solvent(s), said solvent comprising a predominance by weight of ethanol in combination with at least one other solvent, or the solvent is composed of ethyl lactate;
    c) at least 0.1% by weight, with respect to the total weight of the ink, of one or more nutritional or ingestible dye(s) and/or pigment(s); the said ink composition having a conductivity of greater than 300 μS/cm at 20° C.

2. Composition according to claim 1, in which the zein is selected from the group consisting of α, β, γ, and δ zeins and their mixtures and combinations.

3. Composition according to claim 2, in which the zein is chosen from mixtures and combinations of α zein and of β zein.

4. Composition according to claim 1, comprising from 0.5 to 25% by weight, with respect to the total weight of the ink, of at least one zein.

5. Composition according to claim 1, which comprises only synthetic, artificial or mineral constituents or constituents of vegetable origin.

6. Composition according to claim 1, in which the solvent represents from 30 to 90% by weight, of the total weight of the ink composition.

7. Composition according to claim 1, in which the ethanol is denatured or non-denatured ethanol.

8. Composition according to claim 1, in which the dye(s) and/or pigment(s) is (are) selected from the group consisting of curcumin (E100); riboflavin (E101); riboflavin-5'-phosphate (E101(a)); tartrazine (E102); quinoline yellow (E104); yellow 2G (E107); orange yellow sunset (E110); cochineal (E120); carmoisine (E122); amaranth (E123); cochineal red A, ponceau 4R (E124); erythrosine (E127); red 2G (E128); allura red AC (E129); patent blue V (E131); indigotine (E132); brilliant blue FCF (E133); chlorophyll (E140); copper complexes of chlorophylls and chlorophyllins (E141); green S (E142); caramels (E150); brilliant black BN (E151); medicinal vegetable carbon (E153); brown FK (E154); brown HT (E155); dyes of the carotenoid family (E160); xanthophylls (E161); beetroot red (E162); anthocyanins (E163); calcium carbonate (E170); titanium dioxide (E171); iron oxides and hydroxides (E172); aluminium (E173); silver (E174); gold (E175); lithol rubine BK (E180); tannin (E181); lakes; and their mixtures.

9. Composition according to claim 1, which is provided in the form of a dispersion of particles of at least one pigment in the solvent of the ink composition.

10. Composition according to claim 9, in which the pigment is a white pigment.

11. Composition according to claim 9, in which, in the said dispersion, 100% of the particles have a size of less than 0.4 μm.

12. Composition according to claim 1, in which the binder is composed solely of one or more zein(s).

13. Composition according to claim 1, in which the binder comprises, in addition to at least one zein in a predominant proportion by weight with respect to the total weight of the binder, one or more nutritional or ingestible resin(s) and/or polymer(s).

14. Composition according to claim 13, in which the said resin(s) and/or polymer(s) is (are) selected from the group consisting of cellulose ethers, ethylcellulose, methylcellulose, hydroxyethylcellulose, hydroxymethylpropylcellulose, carboxymethylcellulose or hydroxypropylcellulose; shellac; rosin and its nutritional derivatives; polyvinylpyrrolidone; polyvinyl alcohol; cellulose esters, cellulose acetate or cellulose acetate propionate; and their mixtures.

15. Composition according to claim 1, in which the binder represents from 0.1 to 30% by weight of the total weight of the ink.

16. Composition according to claim 1, additionally comprising at least 10 ppm of a polydimethylsiloxane of food grade, or a polydimethylsiloxane.

17. Composition according to claim 1, additionally comprising one or more nutritional or ingestible plasticizer(s) in a proportion of at least 0.05% by weight, of the total weight of the ink composition.

18. Composition according to claim 17, in which the plasticizer(s) is (are) selected from the group consisting of glycerol, lactic acid, oleic acid, polypropylene glycol, fatty acid triglycerides, citrates and esters of citric acid, levulinic acid, and their mixtures.

19. Composition according to claim 1, additionally comprising at least one nutritional or ingestible conductivity salt in a proportion of at least 0.05% by weight, of the total weight of the ink composition.

20. Composition according to claim 19, in which the said conductivity salt is selected from the group consisting of potassium, sodium or ammonium acetates, propionates, citrates or lactates.

21. Composition according to claim 1, which has a conductivity at 20° C. of 500 μS/cm or greater than 500 μS/cm.

22. Composition according to claim 1, additionally comprising one or more nutritional or ingestible additive(s) selected from the group consisting of antifoaming agents, chemical stabilizers, surface-active agents, bactericides, fungicides and biocides, and pH-regulating buffers.

23. A dispersion of particles of titanium dioxide in at least one polar solvent comprising at least one zein as dispersing agent in which 100% of the particles have a size of less than 0.4 μm.

24. A dispersion according to claim 23, composed of at least one polar solvent, particles of titanium dioxide, and at least one zein.

25. A method of facilitating the dispersion of titanium dioxide in at least one polar solvent comprising adding at least one zein to said polar solvent.

26. A method of stabilizing a dispersion of titanium dioxide in at least one polar solvent comprising adding at least one zein to said polar solvent.

27. Process for marking a substrate by projection onto this substrate of an ink by an ink jet printing technique which is the deflected continuous ink jet printing technique, in which the ink projected is an ink composition according to claim 1.

28. Substrate, characterized in that it is provided with a marking obtained by applying and drying the ink composition according to claim 1.

29. Substrate according to claim 28, characterized in that the substrate is selected from the group consisting of foodstuffs.

30. Substrate according to claim 29, which is an eggshell.

31. Composition according to claim 1, in which the said at least one other solvent is selected from the group consisting of ethanol, propylene glycol, ethyl lactate, methyl lactate, ethyl acetate, isopropanol, acetic acid, aqueous ammonia and their mixtures.

32. Composition according to claim 1, in which said at least one other solvent is selected from the group consisting of ethyl lactate and/or methyl lactate and/or water.

33. Composition according to claim 14, in which the said cellulose ethers is (are) selected from the group consisting of ethylcellulose, methylcellulose, hydroxyethylcellulose, hydroxymethylpropylcellulose, carboxymethylcellulose or hydroxypropylcellulose, and said cellulose esters is (are) selected from the group consisting of cellulose acetate or cellulose acetate propionate, and their mixtures.

34. Composition according to claim 7, in which the solvent is denatured or non-denatured ethanol in combination with ethyl lactate.

\* \* \* \* \*